June 4, 1957 A. J. HIRST ET AL 2,794,610
RESILIENT SUSPENSION OF ENGINES
Original Filed Feb. 25, 1948 3 Sheets-Sheet 1
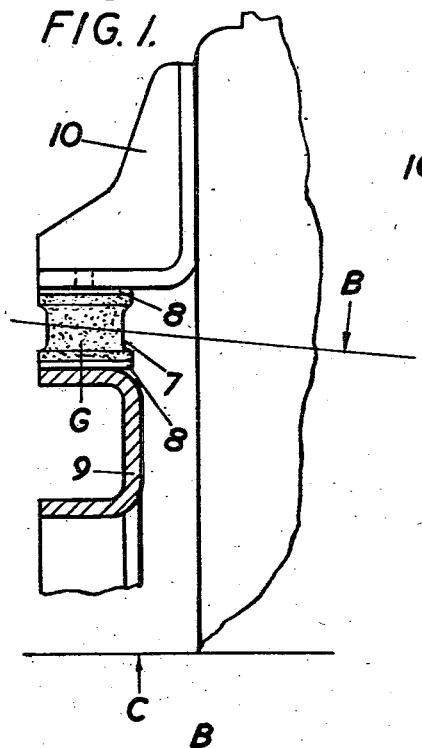
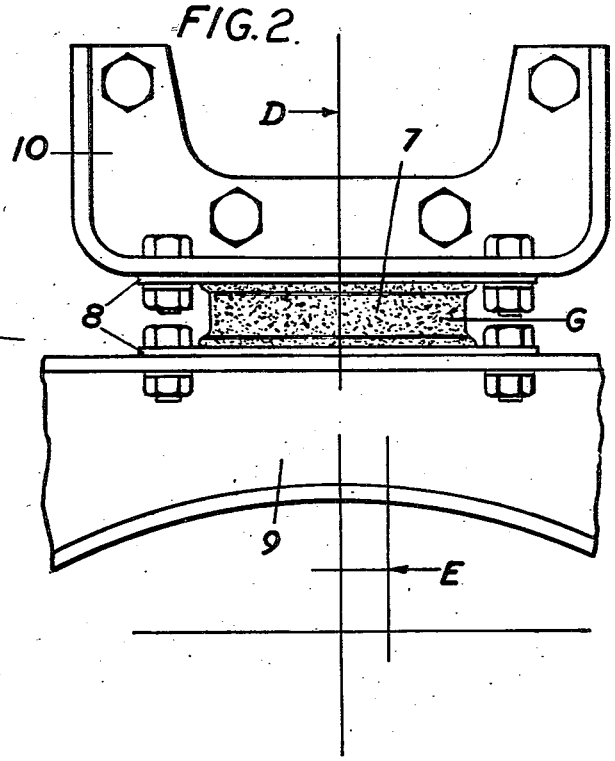
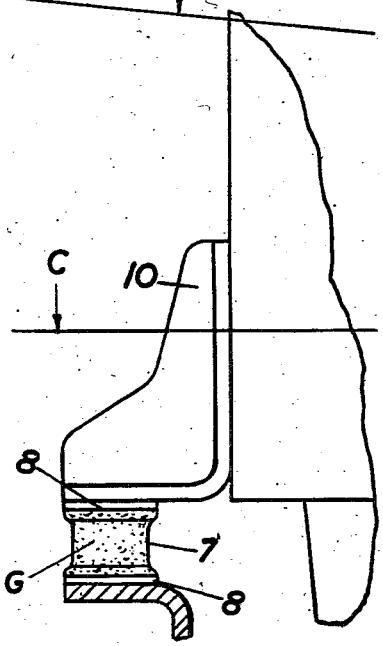
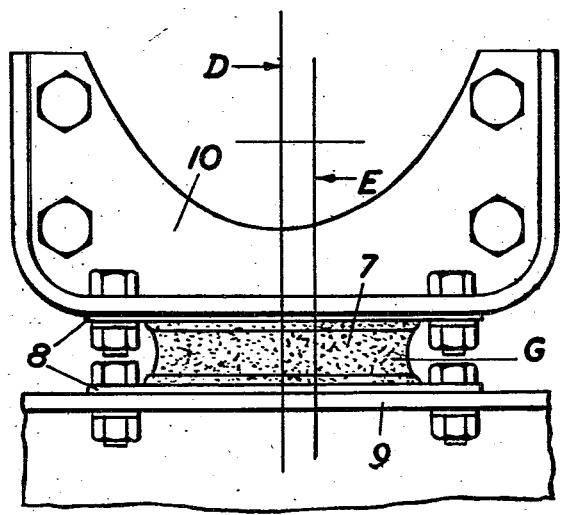
INVENTOR
Archie John Hirst.
BY
Harness, Dickey & Pierce
ATTORNEYS.

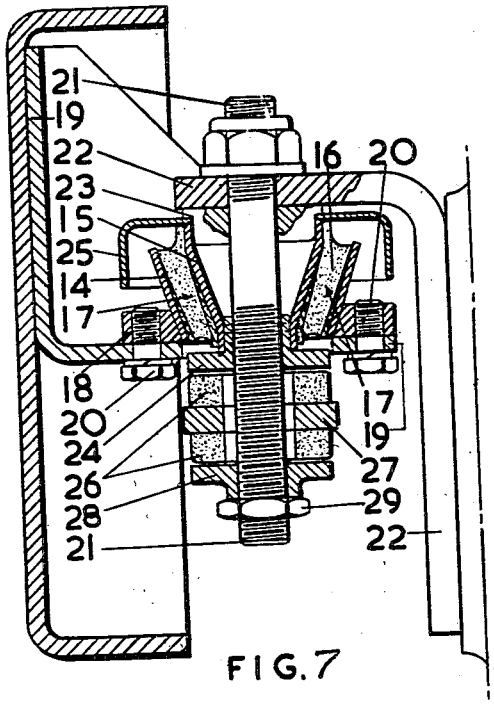
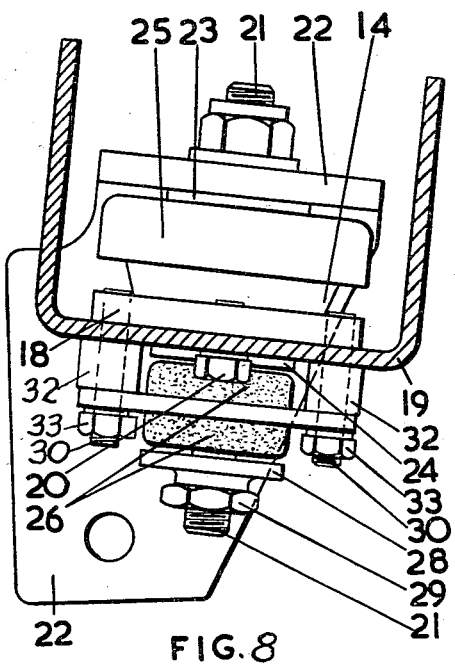
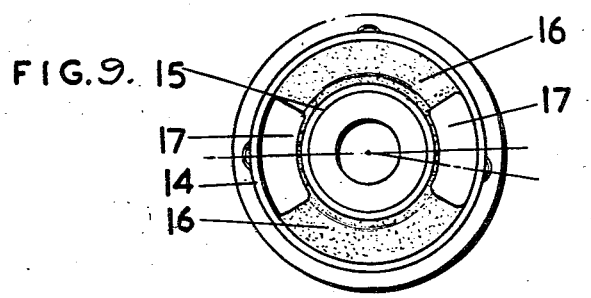

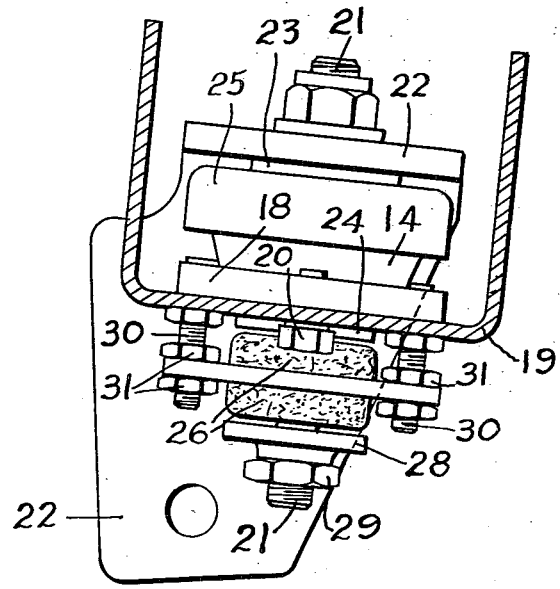
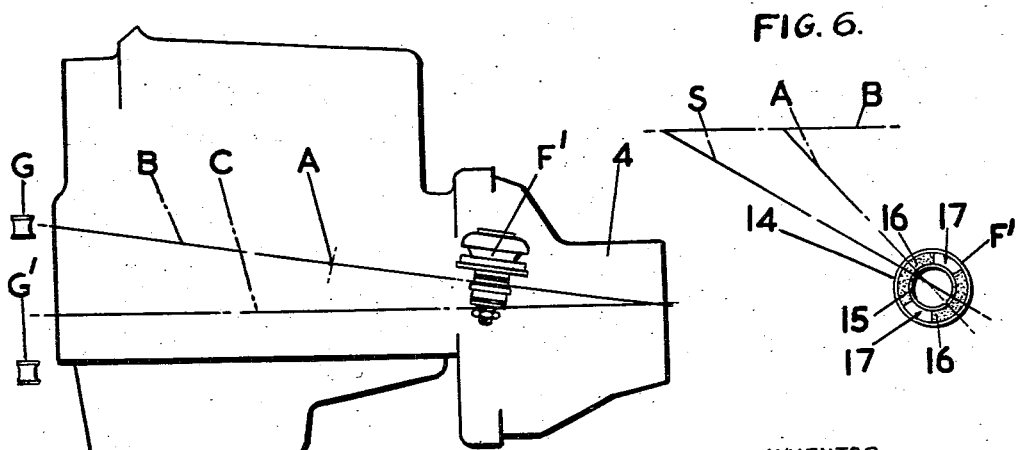

2,794,610

RESILIENT SUSPENSION OF ENGINES

Archie John Hirst and Ronald Nelson Chambers, Leicester, England; said Hirst assignor to Metalastik Limited, Leicester, England, a British company Original application February 25, 1948, Serial No. 10,878. Divided and this application December 9, 1953, Serial No. 405,067. In Great Britain August 3, 1946

Section 1, Public Law 690
Patent expires August 3, 1966

7 Claims. (Cl. 248—10)

This invention relates to systems for suspending or supporting resiliently, engines or motors in such a way that the movements relative to their base or supporting framework due to external or internal vibrational forces, or other irregularities, are constrained so as to take place about predetermined axes or predetermined directions.

In suspending such engines it is often desirable that the mountings or supports should be so arranged that one of the three axes of vibration is the principal axis of the engine, that is the axis passing through the centre of gravity in such a direction that there is a minimum of inertia about the axis, and that the engine if rotated about this axis would be in complete balance, no force or couple being transmitted to the supports due to rotation. In some engines this principal axis will be inclined to the horizontal, and the object of this invention is to provide resilient supports which may be disposed approximately in a horizontal plane, in which case, some of them will not coincide as regards their vertical position with the inclined axis, the construction and arrangement of such supports being such, however, as to ensure rotational displacement about said inclined axis.

In the suspension of internal combustion engines on the chassis frames of motor vehicles it is usual for the clutch and gear box to form, with the engine, a rigid structure. The principal axis of such an engine will be inclined forwardly and upwardly, so that at the rear end it may pass through or near the centre of the universal driving joint, and the forward end will be of a higher level, for example the lower part of the first cylinder. It is desirable that the power unit should be so mounted that torsional vibrations and reactions result in oscillating movements about this inclined principal axis.

In an engine mounting system according to the present invention, the engine is supported by two laterally opposed rubber sandwich mountings at or toward the rear end and by a rubber sandwich mounting at the front end, the rear mountings being disposed well apart one on each side of the engine and in a common plane at right angles to the principal axis and the front mounting being disposed with its laminae horizontal and preferably with its centre line in or approximately in the vertical plane of said principal axis. The front mounting is at or about the same level as the rear mountings and is made very flexible in shear as compared with the shear flexibility of the rear mountings, whilst its vertical flexibility in compression and tension is comparable with the shear flexibility of the rear mountings.

The functioning of the system depends upon the well known characteristic of the rubber sandwich, that the stiffness in compression or tension is many times greater than its stiffness in shear. This relation can be varied by suitable proportioning of the sandwich and also by the addition of intermediate or floating plates, by which the sandwich can be made stiffer in compression without materially altering its stiffness in shear.

According to a further feature of the present invention the rear resilient mountings may be so arranged that their laminations or main planes of shear are inclined inwardly as well as rearwardly. Preferably the inward inclination of the lamination or main planes of shear of the rear resilient mountings is such that their axes of maximum stiffness, i. e. the axes of compression, will intersect at a point on the principal axis somewhat in front of the centre of gravity of the engine or power unit.

With this arrangement the rear resilient mountings will be placed mainly in compression by any lateral load, so that lateral sway of the engine due to road shocks, or lateral deflection when cornering, will be reduced and effectively controlled.

In order that the invention may be clearly understood it will now be more fully described with reference to and by the aid of the embodiments shown, by way of example, in the accompanying drawings; in which:

Figs. 1 and 2 are fragmentary side and front elevations respectively of the front mounting.

Figs. 3 and 4 are similar views to Figs. 1 and 2, but illustrate an alternative arrangement of the front mounting.

Figures 5 and 6 are diagrammatic views showing in side elevation and plan respectively, an application of the invention employing conical type rubber sandwich mountings or supports for the rear end of an automobile engine.

Figs. 7 and 8 are a sectional front elevation and a side elevation respectively of one of the conical type rubber sandwich mountings, but drawn to a larger scale.

Fig. 9 is a plan of the conical sandwich unit shown in Figs. 7 and 8.

Fig. 10 is similar to Figure 8 and shows a modification.

Throughout the drawings, the centre of gravity of the engine, with its associated flywheel and clutch housing is indicated at A, the line B is the axis of oscillation or principal axis of the power unit, the line C is the centre line of the engine crankshaft, and the lines S are the axes of compression of the rear resilient mountings which are generally indicated by the reference letter $F^1$, whilst alternative locations for resilient front mountings are indicated by the letters G and $G^1$.

The engine is supported at its front end by a rubber sandwich mounting G. An alternative location for the front mounting G, as hereinafter described, is shown at $G^1$ in Fig. 5 and in detail in Figs. 3 and 4.

The front mounting G has its vertical centre line intersected by the principal axis B and is somewhat above the level of the rear mountings F.

The front mounting comprises a rubber buffer element 7 bonded to metal bearing plates 8 which are bolted one to a transverse chassis member 9 and the other to a bracket 10 bolted to the front of the engine.

The alternative arrangement of the front mounting shown in Figs. 3 and 4 is similar to that in Figs. 1 and 2 except that the mounting $G^1$ is somewhat lower.

The resilient rear mountings $F^1$, which are spaced well apart one on each side of the engine, are of the conical type and have their axes in a common transverse plane at right angles to the inclined principal axis B so that they are inclined rearwardly to the vertical (see Figs. 5 and 8) but appear to be vertical as seen in front elevation (see Fig. 7). Each of these rear mountings comprises concentric spaced metal cones 14, 15 and the annular rubber insert 16 disposed between them and bonded to them is provided with diametrically opposite openings 17 so that the diametrical centre plane of said openings will constitute the main shear plane of the unit and the latter will have a higher stiffness characteristic when loaded in a radial direction normal to said plane than in the radial direction of said plane.

As shown in Fig. 6 each unit is located with its main plane of shear inclined inwardly so that their compression axes S intersect at a point on the principal axis B somewhat in front of the centre of gravity A.

The outer metal cone 14 of each rear mounting unit is carried by a ring 18 secured by studs 20 to a bracket 19 fixed to the chassis side member. A bolt 21 which passes axially through the inner metal cone 15 is carried by the outwardly projecting limb of an angle bracket 22 fixed to the side of the engine flywheel and clutch housing, and said inner metal cone is located on said bolt 21 between a top bearing disc 23, which has a depending spigot portion fitting within the top of said cone, and a clamping disc 24 screwed on to the threaded lower portion of said bolt and having a spigot portion fitting within the lower end of said metal cone 15. A flanged sheet metal disc 25 carried between the top bearing disc 23 and the upper end of the metal cone 15 overhangs and surrounds the upper part of the cone unit to serve as a protective cover.

Oscillation of the engine about its principal axis is limited by resilient buffer elements incorporated with the rear resilient cone units. Thus rubber buffers 26 are bonded or otherwise secured to opposite sides of a plate 27 carried by screwed studs from the underside of the bracket 19. The bolt 21 passes through clearance openings in the centre of the buffers 26 and plate 27 and carries on its lower end an abutment disc or pressure plate 28 retained by a nut 29. With this arrangement the underside of the clamping disc 24 and the upper surface of the pressure plate 28 serve as abutments for the upper and lower buffers 26 respectively, so that any excessive axial movement of the bolt 21 in either direction will be resisted and controlled by the compression of one or the other buffer 26.

Alternative methods of mounting the plate 27 are shown in Figs. 8 and 10. Thus, as shown in Figure 10 the plate may be located on the screwed studs 30 between nuts 31 or, as shown in Figure 8, the studs 30 may be fitted with distancing sleeves 32 and retaining nuts 33.

Considering first the torque reaction. This will be absorbed almost entirely by the two rear mountings. Since the rear mountings are so much stiffer in shear than the front mounting, the latter will have very little effect in resisting torsional movements of the power unit.

Also since the rear mountings are many times as stiff in shear as the front mountings, and as they are also very stiff in compression and tension, they will constrain the movements of the engine so that very little resistance to lateral deflection will be exerted by the front mounting when the power unit rocks about its inclined axis. In consequence of this arrangement, and more particularly the high resistance to compression and tension of the rear mountings, and the fact that they are spaced fairly widely apart, any lateral movement of the inclined axis will be very small, and torsional reactions will hence result in rocking about this inclined axis.

Internal vertical vibrations or external vertical shocks will permit vertical movement without tilting, in the usual manner, if the compressive stiffness of the front mounting and the vertical component of the shear stiffness of the rear mountings are so related to one another and to their distances horizontally from the C. G. that their effects balance.

The small fore and aft movement which may take place when accelerating or braking, is much less than that due to the propeller shaft movement resulting from the normal spring deflection, and will be of negligible importance.

Lateral forces are resisted by shear of the rear mountings, and to a very limited extent by shear of the front mountings.

Any tendency of the inclined axis to move laterally, is strongly resisted by the high degree of stiffness of the rear mountings in compression and tension. There will be a slight tendency for the rear end of the engine to lift under acceleration loads and to drop under braking loads, but the amount of such movement is entirely negligible in comparison with the other movements for which definite provision is made.

The grade of rubber employed and the design of the mountings in relation to masses and frequencies will be such as to avoid resonance under any of the conditions of freedom of movement referred to above.

Instead of the rubber insert of each cone unit being in the form of a complete annulus with diametrically opposed through openings, it may comprise two separate arcuate rubber masses which are opposed and of such dimensions as to leave diametrically opposed gaps or spaces between their adjacent edges.

We claim:

1. The combination of an engine having as its principal axis an axis through its centre by gravity and about which the moment of inertia is a minimum, a supporting structure for the engine, a sandwich type resilient front mounting comprising a pair of generally flat, spaced, parallel, and horizontally disposed attachment members, a flat horizontally disposed resilient mounting element disposed between said attachment members and bonded thereto, one of said attachment members being rigidly connected to said engine, the other of said attachment members being rigidly connected to said supporting structure, a pair of conical sandwich type resilient rear mountings disposed at opposite sides of said engine, each of said rear mountings comprising first attachment means rigidly secured to said engine, second attachment means rigidly secured to said supporting structure, and resilient mounting element means, said first attachment means, said second attachment means and said mounting element means having concentric conical bonding surfaces with a common axis, the bonding surfaces of said mounting element means being bonded to the bonding surfaces of said first and second attachment means, said common axis of said bonding surfaces of each of said rear mountings lying in a common transverse plane at right angles to said principal axis.

2. The combination as defined in claim 1, wherein said mounting element means each have diametrically opposed openings disposed symmetrically about a diametral plane containing said common axis, normals to said diametral planes and said common axis intersecting on said principal axis and in front of the centre of gravity of said engine.

3. The combination as defined in claim 1, wherein said common axes are parallel.

4. The combination as defined in claim 1, wherein said front mounting has a vertical flexibility in compression and tension which is comparable to the vertical shear flexibility of said rear mountings.

5. The combination as defined in claim 1 which further comprises in each of said rear mountings resilient buffer elements, means for supporting said buffer elements from one of said first and second attachment means and means supported from the other of said first and second attachment means, for abutting said buffer element upon predetermined relative displacement of said first and second attachment means.

6. The combination as defined in claim 1 wherein said principal axis passes through said resilient mounting element.

7. The combination as defined in claim 1 wherein said principal axis intersects the vertical central axis of said resilient mounting element well above said front mounting.

References Cited in the file of this patent
UNITED STATES PATENTS

| | | |
|---|---|---|
| 2,460,586 | Keetch | Feb. 1, 1949 |
| 2,538,954 | Efromson et al. | Jan. 23, 1951 |
| 2,538,955 | Efromson et al. | Jan. 23, 1951 |

FOREIGN PATENTS

| | | |
|---|---|---|
| 593,121 | Great Britain | Oct. 8, 1947 |
| 614,836 | Great Britain | Dec. 23, 1948 |
| 615,965 | Great Britain | Jan. 13, 1949 |
| 836,914 | France | Oct. 25, 1938 |